Sept. 27, 1955     H. W. BOUSMAN     2,719,262
ELECTRICAL MEASURING APPARATUS
Filed Nov. 14, 1949
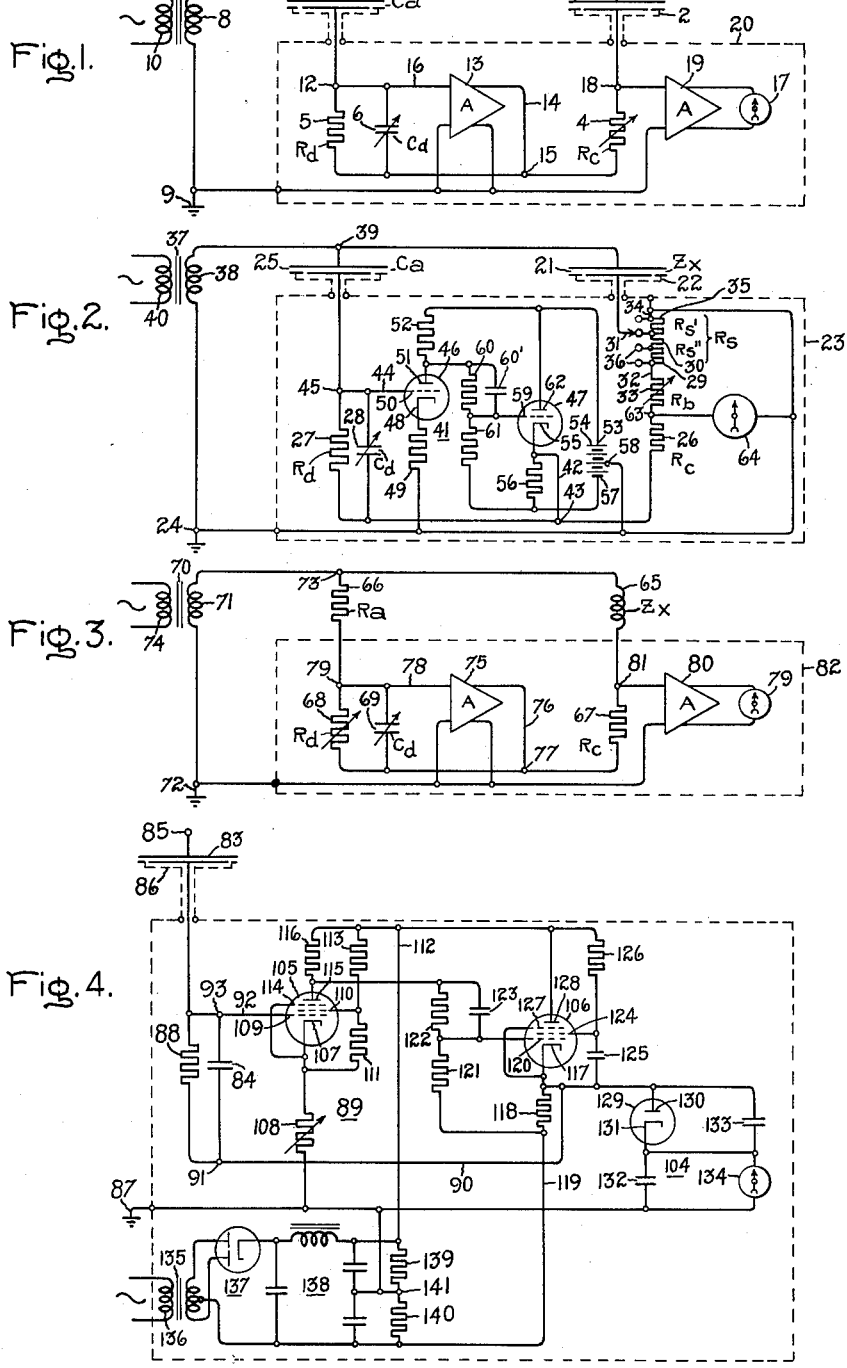
Inventor:
Henry W. Bousman,
by Paul A. Frank
His Attorney.

United States Patent Office 2,719,262
Patented Sept. 27, 1955

2,719,262
ELECTRICAL MEASURING APPARATUS
Henry W. Bousman, Scotia, N. Y., assignor to General Electric Company, a corporation of New York Application November 14, 1949, Serial No. 127,177

5 Claims. (Cl. 324—57)

This invention relates to electrical measuring apparatus, and in particular to improved apparatus for measuring electrical impedance and potential in which a phase-inverting amplifier is used to neutralize undesired capacitance to ground.

An object of this invention is to provide improved electrical measuring apparatus in which undesired capacitance to ground is neutralized.

Another object is to provide improved electrical impedance-measuring apparatus in which both input and output circuits have a terminal which may be grounded.

Another object is to provide improved apparatus for measuring dielectric characteristics of high-voltage cable.

Another object is to provide improved apparatus for measuring large alternating electric potentials.

Other objects and advantages will appear as the description proceeds. The features of the invention which are believed to be novel and patentable are pointed out in claims which form a part of this specification.

For a better understanding of the invention, reference is made in the following description to the accompanying drawing, in which Figs. 1, 2, and 3 are schematic diagrams of respective forms of impedance measuring apparatus embodying principles of this invention, and Fig. 4 is a schematic diagram of improved apparatus for measuring alternating electric potentials.

Referring now to Fig. 1, capacitor 1 represents an element, the electrical impedance of which is to be measured. This capacitor may be of the shielded type, as represented by shielding 2. Capacitor 1 may be an actual high-voltage capacitor, or may be a section of a high-voltage cable, the dielectric characteristics of which are to be tested.

Capacitor 1 is connected in one branch of a circuit mesh having four branches, the other three branches of which comprise a shielded standard capacitor 3, a calibrated variable resistor 4, and a parallel circuit comprising resistor 5 and calibrated variable capacitor 6. A transformer 7 has a secondary 8 connected between a ground 9 and the circuit junction between capacitors 1 and 3, as shown. Ground 9 may be a connection to earth, or to some other body serving as a ground, such as the chassis of the apparatus. The primary 10 of transformer 7 is energized from a convenient source of alternating current, whereby an alternating electric potential is applied to the circuit junction 11 between capacitors 1 and 3.

The circuit junction 12 between the branch containing capacitor 3 and the branch containing resistor 5 and capacitor 6 is maintained at substantially zero alternating potential by a phase-inverting amplifier 13 having an output connection 14 to the circuit junction 15 between the branch containing resistor 4 and the branch containing resistor 5 and capacitor 6, and having an input connection 16 to circuit junction 12. Any small alternating potential at junction 12 is amplified and reversed in phase by amplifier 13, and this amplified inverted potential is applied to junction 15. This produces a degenerative action which maintains junction 12 at substantially zero alternating potential by providing through the lower branch of the potential divider, comprising resistor 5 and capacitor 6, an alternating current which is 180° out of phase with the current provided through the upper branch of the divider, comprising capacitor 3, by the secondary of transformer 7.

Indicating means comprising an indicating instrument 17 is connected between ground 9 and the circuit junction 18 between the branch containing capacitor 1 and the branch containing resistor 4, in responsive relation to alternating potential at junction 18. An amplifier 19 may be provided if desired, to increase the sensitivity of the indicating means.

This apparatus is preferably used in a manner similar to a bridge circuit, by adjusting the impedance of one or more of the circuit branches until instrument 17 indicates zero alternating potential at circuit junction 18. This may be accomplished by adjusting the value of calibrated variable resistor 4 and calibrated variable capacitor 6, but it will be appreciated that a balance can be obtained by adjusting the impedance of other branches of the circuit mesh. For example, resistor 5 may be a calibrated variable resistor, and balance may be obtained by adjusting resistor 5 and capacitor 6.

Representing the impedance of capacitor 1 by the symbol $Z_x$ comprising a capacitance $C_x$ and a resistance $R_x$, and representing the capacitance of capacitor 3 by the symbol $C_a$, the resistance of resistor 4 by $R_c$, the resistance of resistor 5 by $R_d$, and the capacitance of capacitor 6 by $C_d$, the unknown impedance is expressed by the following equations:

$$C_x = \frac{C_a R_d}{R_c}$$

$$R_x = \frac{R_c}{C_a} C_d$$

The "tangent loss angle" of capacitor 1, its resistance divided by its reactance, is equal to $\omega C_d R_d$, where $\omega$ represents $2\pi$ times the frequency of alternating current applied to transformer primary 10.

These balance equations are the same as for those of the well-known Schering bridge. However, this apparatus has advantages over the Schering bridge in that both the input circuit, transformer secondary 8, and the output circuit, instrument 17 and amplifier 19, have a terminal which may be grounded. Also, one terminal of the capacitor 1 being measured is at substantially zero or ground potential under balance conditions, so that the capacitance of shield 2 is neutralized when this shield is connected to ground, as shown. This neutralization is due to the fact that shielding 2 and the lower portion of capacitor 1, which is adjacent to the shielding, are maintained at the same alternating potential. Therefore, there is no alternating voltage across the shielding capacitance, and consequently there is substantially no flow of current to the shielding. Other shielding 20, as shown, may be employed to eliminate pickup from stray electromagnetic fields.

It will be appreciated that variations in the circuit arrangement shown are possible without departing from the essential principles of the invention. For example, various branches of the circuit mesh may be interchanged, as by transposing capacitors 1 and 3, or by interchanging the two upper branches with the two lower branches of the mesh. Also, the same principles can be applied to other bridge circuits having other types of impedance elements in the various branches.

When large alternating electric potentials are used in testing the dielectric characteristics of high-voltage cable, a considerable current may flow through the capacitance of the cable. In such cases, the circuit arrangement shown in Fig. 2 is preferred.

Referring now to Fig. 2, the element to be tested may be a high-voltage cable represented in the drawing as shielded capacitor 21. Shielding 22, connected through the measuring apparatus shielding 23 to ground 24, represents any ground within or near the cable from which a capacitance to a cable conductor may exist. Capacitor 21 is connected in one branch of a circuit mesh having four branches, the other three branches of which comprise a shielded standard capacitor 25, a resistor 26, and a parallel circuit comprising a resistor 27 and a calibrated variable capacitor 28, respectively. The portion 29 of a tapped resistor 30 between its adjustable tap 31 and one of its ends 32 is connected in series with capacitor 21 and in the same branch of the circuit mesh, as shown. In series with end 32 of the tapped resistor is a calibrated variable resistor 33. The other end 34 of the tapped resistor is connected to ground 24. The major portion of the alternating current conducted by capacitor 21 thus flows to ground through portion 35 of tapped resistor 30. Tap 31 connects to resistor 30 through heavy copper contacts 36, so that the contact resistance has a minimum value. This arrangement substantially avoids errors which may be encountered in conventional bridge circuits due to voltage drops across contact resistances when large currents flow through the element being measured.

A transformer 37 has a secondary 38 connected between ground 24 and the circuit junction 39 between the branch containing capacitor 21 and the branch containing capacitor 25. The primary 40 of this transformer is energized from a suitable source of alternating current, to apply alternating electric potential to circuit junction 39.

A phase-inverting amplifier 41 has an output connection 42 to the circuit junction 43 between the branch containing resistor 26 and the branch containing resistor 27 and capacitor 28, and has an input connection 44 to the circuit junction 45 between capacitors 25 and 28. Amplifier 41 may comprise triode vacuum tubes 46 and 47. Tube 46 has a cathode 48 connected to ground 24 through a cathode resistor 49, a control electrode 50 connected to input connection 44, and an anode 51 connected through a resistor 52 to the positive side 53 of a direct voltage supply, such as battery 54. Tube 47 has a cathode 55 connected directly to output connection 42, and also connected through resistor 56 to the negative side 57 of voltage supply 54. A center terminal 58 of voltage supply 54 is connected to ground 24, as shown.

The control electrode 59 of tube 47 is connected through a resistor 60 to the anode of tube 46, and through a resistor 61 to the negative side 57 of the voltage supply. A phase-advancing capacitor 60' may be connected in parallel with resistor 60. Anode 62 of tube 47 is connected directly to the positive side 53 of the voltage supply. Any small alternating potential at circuit junction 45 is amplified and inverted in phase by amplifier 41, and the amplified inverted potential is applied through connection 42 to circuit junction 43. This provides a degenerative action which maintains junction 45 at substantially zero alternating potential. To maintain this potential at a value even nearer to zero, and thus increase the accuracy of the measuring apparatus, additional stages of amplification may be provided, if desired.

To indicate alternating electric potential at the circuit junction 63 between the branch containing capacitor 21 and the branch containing resistor 26, an indicating instrument 64 is connected between circuit junction 63 and ground 24. For increased sensitivity, if desired an amplifier may be connected in circuit with instrument 64 as hereinbefore explained in connection with Fig. 1.

This apparatus is preferably operated in a manner similar to a bridge, by adjusting the impedance of one or more branches of the circuit mesh until instrument 64 indicates zero alternating potential at circuit junction 63. This adjustment is preferably made by adjusting the value of calibrated variable capacitor 28 and calibrated variable resistor 33, and by adjusting the position of tap 31. Representing the impedance of element 21 by the symbol $Z_x$ comprising a capacitance $C_x$ and a resistance $R_x$, and representing the capacitance of capacitor 25 by $C_a$, the resistance of resistor 35 by $R_s$, comprising an upper portion resistance $R_{s'}$ and a lower portion resistance $R_{s''}$, the resistance of resistor 33 by $R_b$, that of resistor 26 by $R_c$, that of resistor 27 by $R_d$, and the capacitance of capacitor 28 by $C_d$, the capacitance of element 21 is given by the equation $$C_x = \frac{C_a R_d}{R_c}\left(\frac{R_s + R_b}{R_{s'}}\right)$$

The "tangent loss angle" of element 21 is equal to $$\omega R_d C_d - \frac{\omega C_a R_d}{R_c}(R_{s''} + R_b)$$

in which the second term may be small enough to be disregarded in factory measurements if a small standard capacitor 25, having a capacitance in the order of 50 micro-microfarads or less, is used.

In balancing this bridge, tap 31 is adjusted for a rough balance, and resistor 33 and capacitor 28 are adjusted for the final balance. Although with this arrangement, the lower terminal of capacitor 21 is not quite at ground potential, and therefore the capacitance to shield 22 is not completely neutralized, the effect of this undesired capacitance is generally small enough to be neglected if the resistance $R_{s'}$ is small. If desired, complete neutralization can be obtained by applying a small alternating potential to shield 22.

When the element to be measured has an inductive reactance, it may be desirable to use the arrangement shown in Fig. 3. In this figure, the element to be measured is represented as an inductor 65 having an impedance $Z_x$ which is equivalent to an inductance $L_x$ and a resistance $R_x$. Inductor 65 is connected in one branch of a circuit mesh having four branches, the other three branches of which comprise a resistor 66 having a resistance $R_a$, resistor 67 having a resistance $R_c$, and a parallel circuit consisting of a resistor 68 having a resistance $R_d$ and a capacitor 69 having a capacitance $C_d$. A transformer 70 has a secondary 71 connected between a ground 72 and the circuit junction 73 between inductor 65 and resistor 66. Primary 74 of transformer 70 may be energized from a suitable source of alternating current to apply alternating electric potential to circuit junction 73.

A phase-inverting amplifier 75 has an output connection 76 to the circuit junction 77 between resistors 67 and 68, and an input connection 78 to the circuit junction 79 between resistors 66 and 68. An indicating instrument 79, and if desired for increased sensitivity, an amplifier 80, is connected between ground 72 and the circuit junction 81 between inductor 65 and resistor 67. Shielding 82 may be provided to exclude stray electromagnetic fields.

The balance equations for this apparatus are $$L_x = R_a R_c C_d$$
$$R_x = \frac{R_a R_c}{R_d}$$

The "tangent loss angle" is equal to $$\frac{1}{\omega C_d R_d}$$

These equations are the same as those for a Maxwell bridge.

In measuring large alternating potentials, it is common practice to use two capacitors connected in series as a potential divider. The high voltage capacitor in this divider, for construction and safety reasons, is usually of a type having a grounded shield. In the usual potential divider, capacitance to this shield is a complicating factor in the measurement. This capacitance may be neutralized in the manner shown in Fig. 4. In this figure, capacitors 83 and 84 are connected in series to form a potential divider. At the upper end of this divider is a connection 85 to which alternating potential to be measured may be applied. High voltage capacitor 83 may be of a shielded type having shielding 86 connected to a ground 87. A resistor 88 is preferably connected in parallel with capacitor 84.

A phase-inverting amplifier 89 has an output connection 90 to the lower end 91 of the potential divider, and an input connection 92 to the circuit junction 93 between capacitors 83 and 84. This amplifier operates in a degenerative manner to maintain the alternating electric potential of junction 93 at substantially zero value. This maintains the lower terminal of capacitor 83 at substantially ground or zero alternating potential, and thus neutralizes the capacitance to shielding 86.

Since the respective voltage drops across capacitors 83 and 84 are inversely related to their capacitance values, the amplitude of the alternating potential at junction 91 has a fixed relation to the amplitude of alternating potential applied to connection 85. Indicating means 104 is connected in responsive relation to the crest value of alternating potential at junction 91, and thus provides a measure of the crest value of the unknown potential when the indications are multiplied by the capacitance ratio of capacitor 84 to capacitor 83.

Amplifier 89 may comprise two vacuum tubes 105 and 106, which may be pentodes, as shown. Tube 105 has a cathode 107 connected through a cathode resistor 108 to ground 87, a control electrode 109 connected to input connection 92, a screen electrode 110 connected to cathode 107 through a resistor 111, and connected to a positive direct voltage connection 112 through a resistor 113, a suppressor electrode 114 connected to cathode 107, and an anode 115 connected to positive voltage connection 112 through a resistor 116.

Tube 106 has a cathode 117 connected directly to output connection 90, and connected through a cathode resistor 118 to a negative direct voltage connection 119. Tube 106 has a control electrode 120 connected to negative voltage connection 119 through a grid leak resistor 121 and connected to anode 115 through a resistor 122 and a capacitor 123 in parallel, a screen electrode 124 connected to cathode 117 through a capacitor 125 and connected to positive voltage connection 112 through a resistor 126, a suppressor electrode 127 connected to cathode 117, and an anode 128 connected directly to positive voltage connection 112.

Indicating means 104 may comprise a diode rectifier 129 having an anode 130 connected to amplifier output connection 90 and having a cathode 131 connected through a capacitor 132 to ground 87. A capacitor 133 is connected in parallel with diode 129, and a galvanometer 134 is connected in parallel with capacitor 132. The indications of galvanometer 134 are proportional to the crest value of alternating potential at amplifier output connection 90, and hence are proportional to the crest value of alternating potential applied to connection 85.

Positive direct voltage is applied to connection 112, and negative direct voltage to connection 119, by conventional voltage supply means comprising a transformer 135 having a primary 136 which may be energized from a suitable alternating current source, a full wave rectifier circuit 137, and a filter circuit 138. Resistors 139 and 140 are connected in series between connections 112 and 119, and the circuit junction 141 of these two resistors is connected to ground 87, as shown.

Alternatively or additionally, a voltmeter which indicates R. M. S. voltage may be connected from junction 91 to ground, to measure the R. M. S. value of alternating potential applied to connection 85. Having described the principle of this invention and the best mode in which I have contemplated applying that principle, I wish it to be understood that the apparatus described is illustrative only, and that other means can be employed without departing from the true scope of the invention.

What I claim as new and desire to secure by Letters Patent of the United States is:

1. In electrical measuring apparatus, the combination of a resistor and a capacitor connected in parallel, an impedance element connected in series with said resistor, connections for applying alternating electric potential to the end of said impedance element remote from said resistor, a phase-inverting amplifier having an input connection to the circuit junction between said resistor and said impedance element and having an output connection to the other end of said resistor, whereby such circuit junction is maintained at substantially zero alternating electric potential, and an indicating instrument operatively connected to the output of said phase-inverting amplifier.

2. In electrical measuring apparatus, the combination of a potential divider comprising two capacitors connected in series, connections for applying alternating electric potential to one end of said potential divider, and a phase-inverting amplifier having an output connection to the other end of said potential divider and having an input connection to the circuit junction between said capacitors, whereby such circuit junction is maintained at substantially zero alternating electric potential.

3. Apparatus for measuring electrical impedance, comprising a circuit mesh having four branches, a ground, a transformer having a secondary connected between said ground and the circuit junction between the first and second of said branches, a phase-inverting amplifier having an output connection to the circuit junction between the third and fourth of said branches and having an input connection to the circuit junction between said first and fourth branches, said first branch consisting essentially of a capacitor, said second branch including the portion between a calibrated adjustable tap and one end of a tapped resistor and a calibrated variable resistor connected between such end of said tapped resistor and the circuit junction between said second and third branches, the other end of said tapped resistor being connected to said ground, connections for inserting an element the impedance of which is to be measured into said second branch between said tap and the circuit junction between said first and second branches, said third branch consisting essentially of a resistor, said fourth branch consisting essentially of a resistor and a calibrated variable capacitor connected in parallel, and means for indicating alternating electric potential at the circuit junction between said second and third branches.

4. Apparatus for measuring alternating electric potential, comprising two capacitors connected in series as a potential divider, connections for applying the potential to be measured to one end of said potential divider, a phase-inverting amplifier having an output connection to the other end of said potential divider and having an input connection to the circuit junction between said two capacitors, and indicating means connected in responsive relation to the potential at said amplifier output connection.

5. An electrical measuring apparatus including in combination first and second impedances connected in series circuit relationship, connections for applying alternating electric potential to the end of the first impedance remote from the second impedance, a phase-inverting amplifier having an input connection to the circuit junction between said first and second impedances and having an output connection to the end of said second impedance remote from said first impedance whereby the circuit junction of the first and second impedances is maintained at substantially zero alternating electric potential, and an indicating instrument operatively connected to the output of said phase-inverting amplifier.

References Cited in the file of this patent

UNITED STATES PATENTS

| | | |
|---|---|---|
| 2,094,207 | Eaton | Sept. 28, 1937 |
| 2,449,739 | Duttera | Sept. 21, 1948 |
| 2,508,416 | Murakami | May 23, 1950 |
| 2,589,184 | Zinn | Mar. 11, 1952 |
| 2,623,929 | Moody et al. | Dec. 30, 1952 |